United States Patent [19]
Hanson et al.

[11] Patent Number: 5,730,498
[45] Date of Patent: Mar. 24, 1998

[54] QUICK RELEASE CLOSURE ASSEMBLY

[75] Inventors: Wayne H. Hanson; Timothy R. Border, both of Bozeman; Evyln K. Gorsuch, Belgrade, all of Mont.

[73] Assignee: Jay Medical Ltd., Longmont, Colo.

[21] Appl. No.: 747,983

[22] Filed: Nov. 12, 1996

[51] Int. Cl.⁶ .................................................. B60R 22/10
[52] U.S. Cl. .......................... 297/465; 297/484; 2/2.17; 2/69; 24/306; 24/432
[58] Field of Search .......................... 297/464, 465, 297/485, 484; 2/2.17, 69, 69.5, 84, 920; 24/306, 432

[56] References Cited

U.S. PATENT DOCUMENTS

| | | | |
|---|---|---|---|
| 3,099,486 | 7/1963 | Scott | 297/465 |
| 4,226,474 | 10/1980 | Rupert et al. | 297/465 X |
| 4,639,946 | 2/1987 | Koenig | 297/465 |
| 4,829,603 | 5/1989 | Schnoor et al. | 2/69 |
| 5,077,838 | 1/1992 | Senser | 2/69 |

*Primary Examiner*—Peter R. Brown
*Attorney, Agent, or Firm*—Flehr Hohbach Test Albritton & Herbert

[57] ABSTRACT

A chest harness (10) includes a right harness piece (12) and a left harness piece (14). Right harness piece (12) includes an elongated right shoulder extension (16) and a lower torso portion (18). A narrow flap (20) is secured to the inside edge (22) of torso portion (18). On the inside face of flap (20) is secured a set of VELCRO type hooks (25) that cooperate with corresponding loops (27) on left harness piece (14). A first half (24) of a zipper (26) is secured to inside edge (22). Zipper (26) includes a handle (28), which is carried by zipper half (24). A draw cord or loop (29) is tied to handle (28). Draw cord (29) is longer than zipper (26), so that the draw cord can extend along the zipper and past the lower end of the zipper. Left harness piece (14) includes an elongated left shoulder extension (38) and a lower torso portion (40). Lower torso portion (40) includes a plastic backing plate (42) that is sufficiently wide to underlie the lower torso portion (18) of right harness piece (12). A second half (44) of zipper (26) is secured approximately at the center of torso portion (40). Loops (27) are spaced from zipper half (44) so as not to interfere with operation of the zipper.

19 Claims, 5 Drawing Sheets

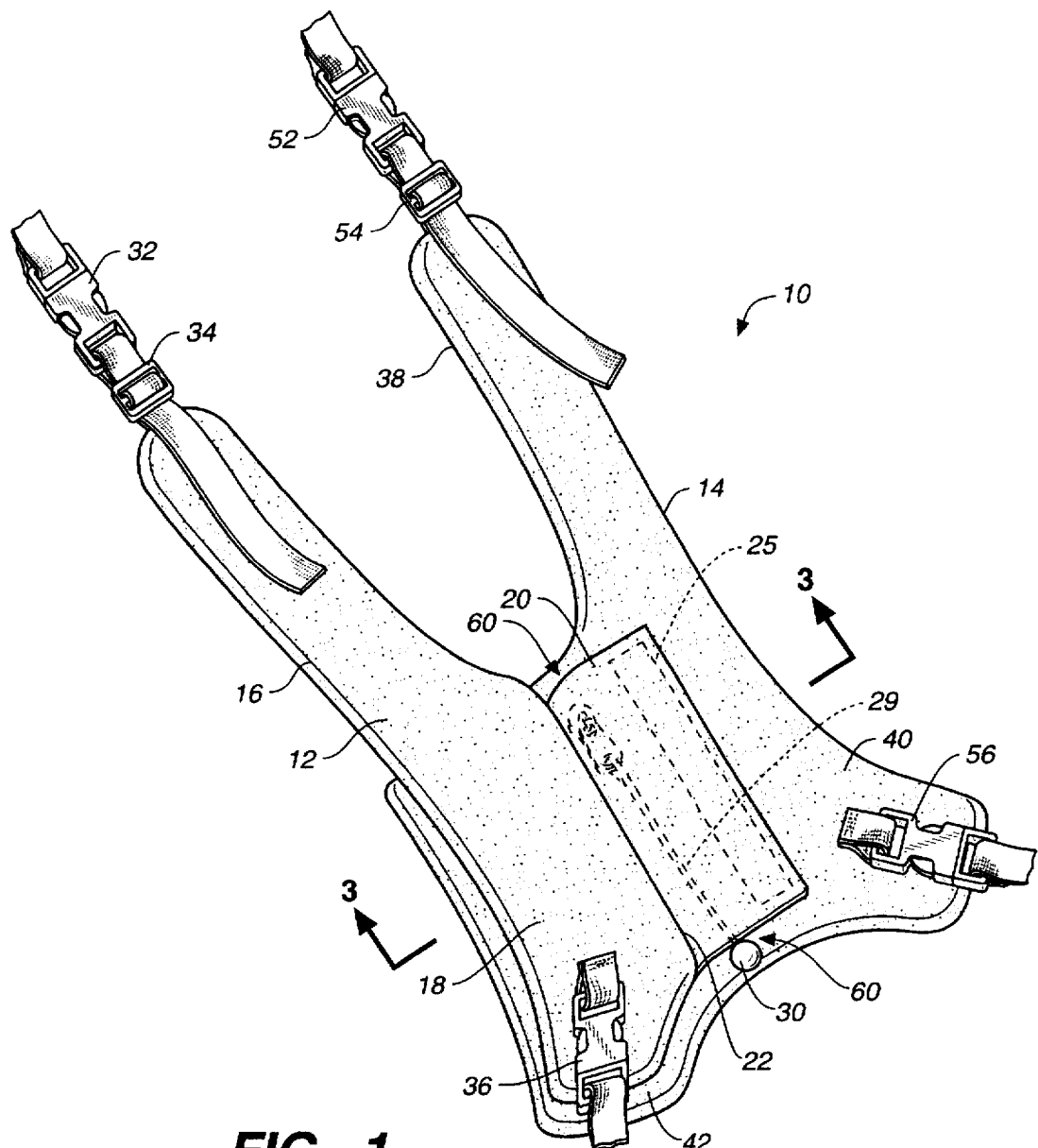
FIG._1

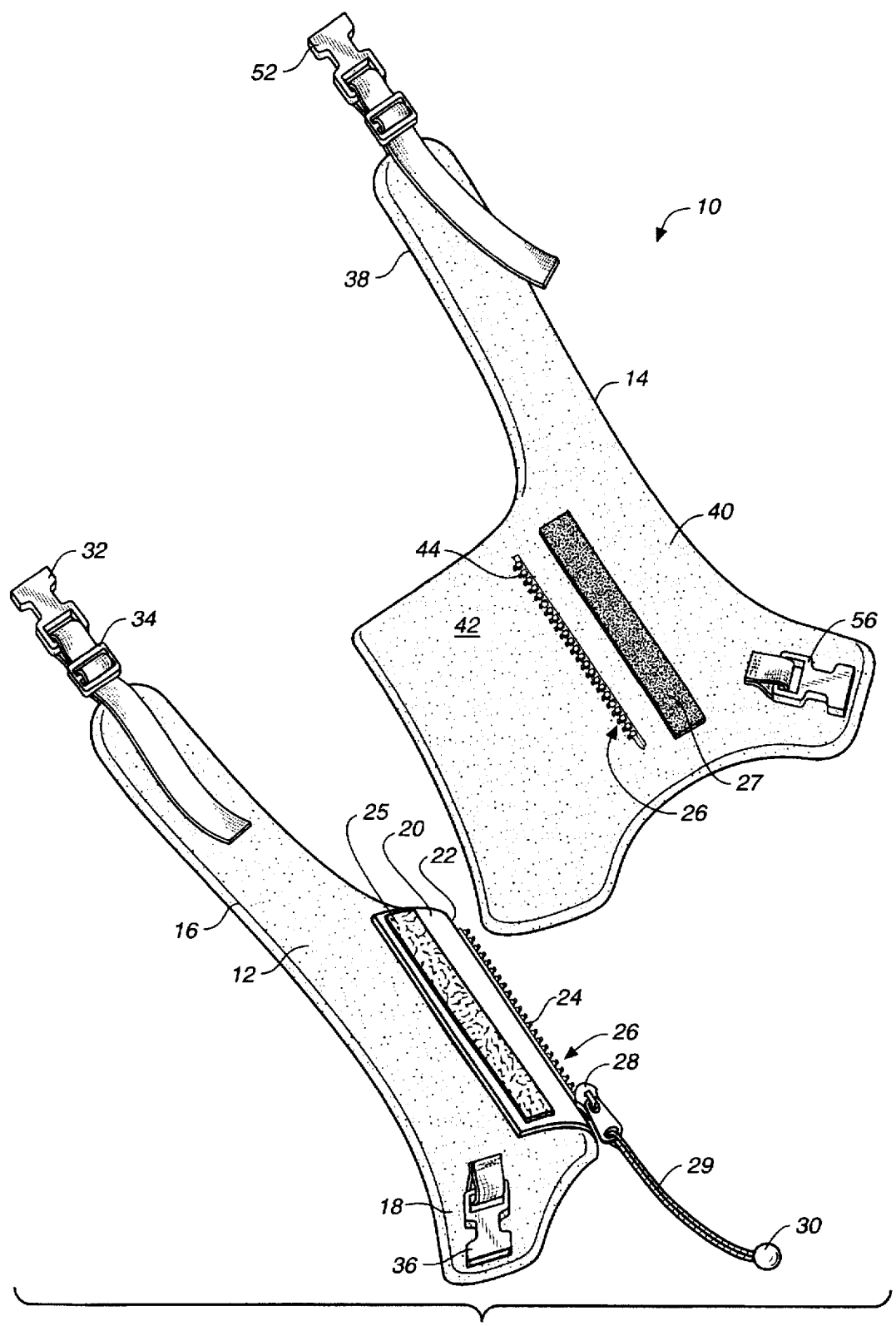
FIG._2

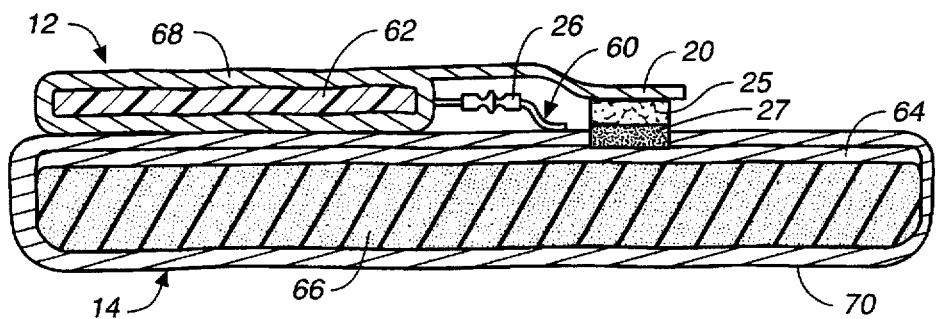
FIG._3
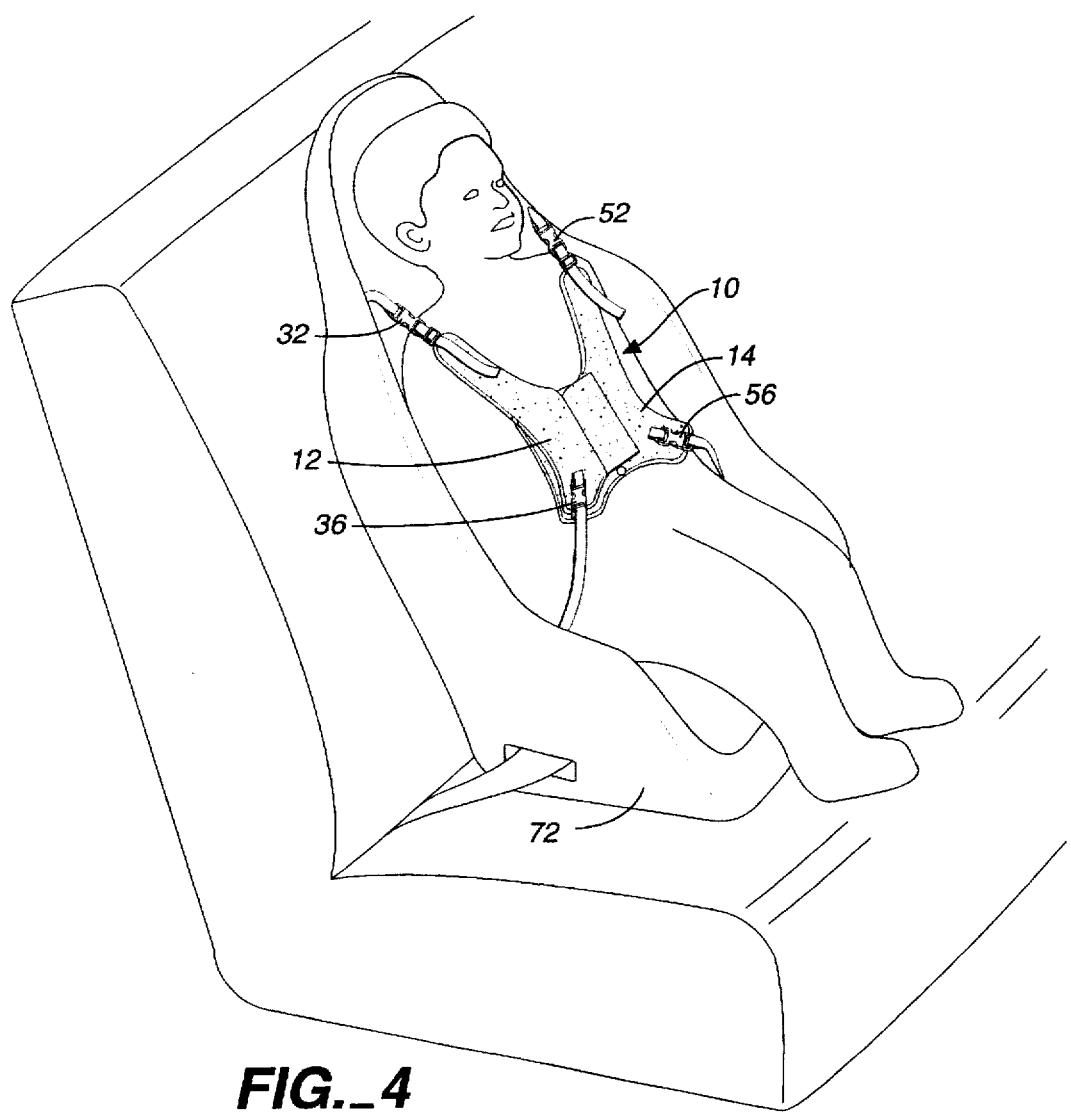
FIG._4

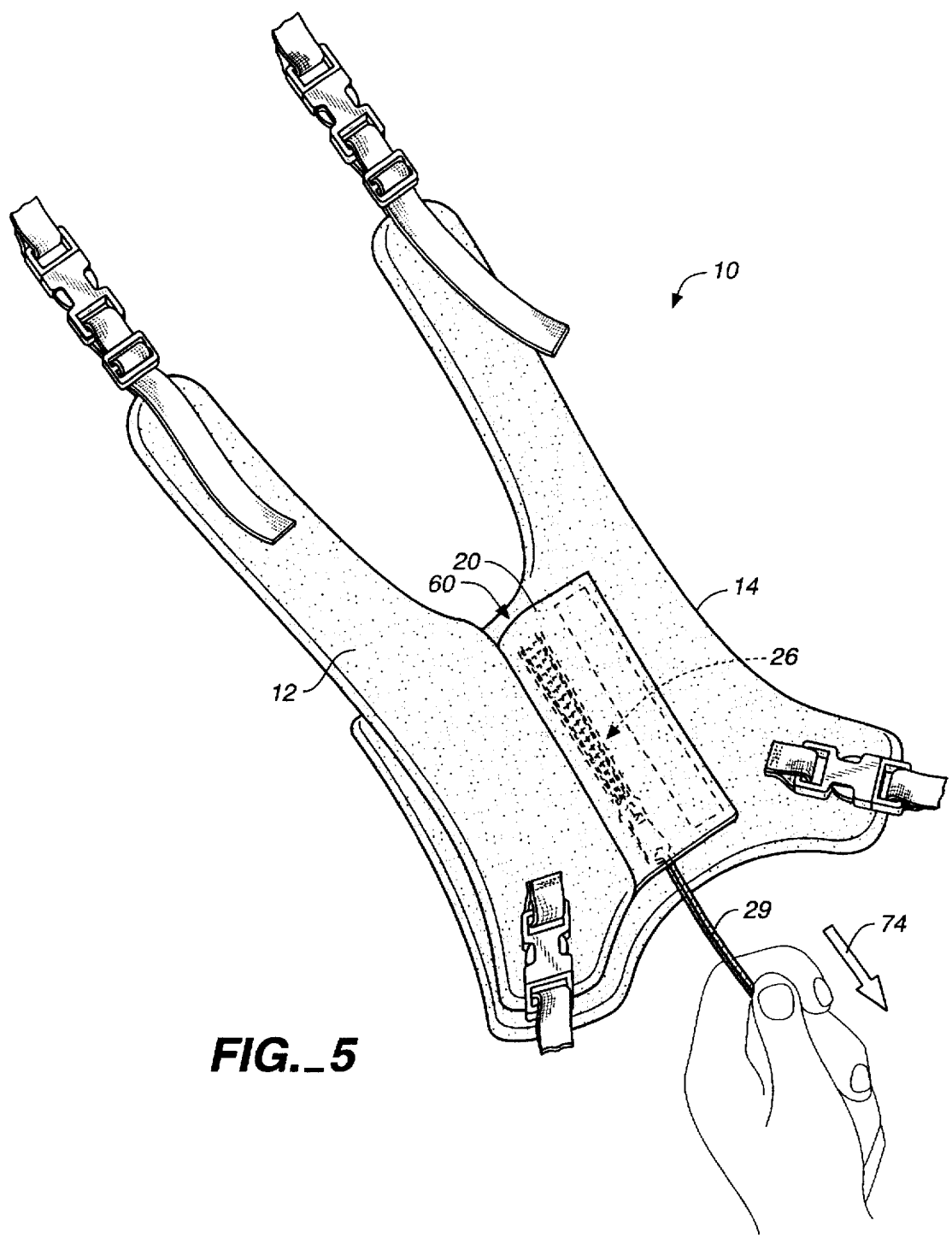
FIG._5

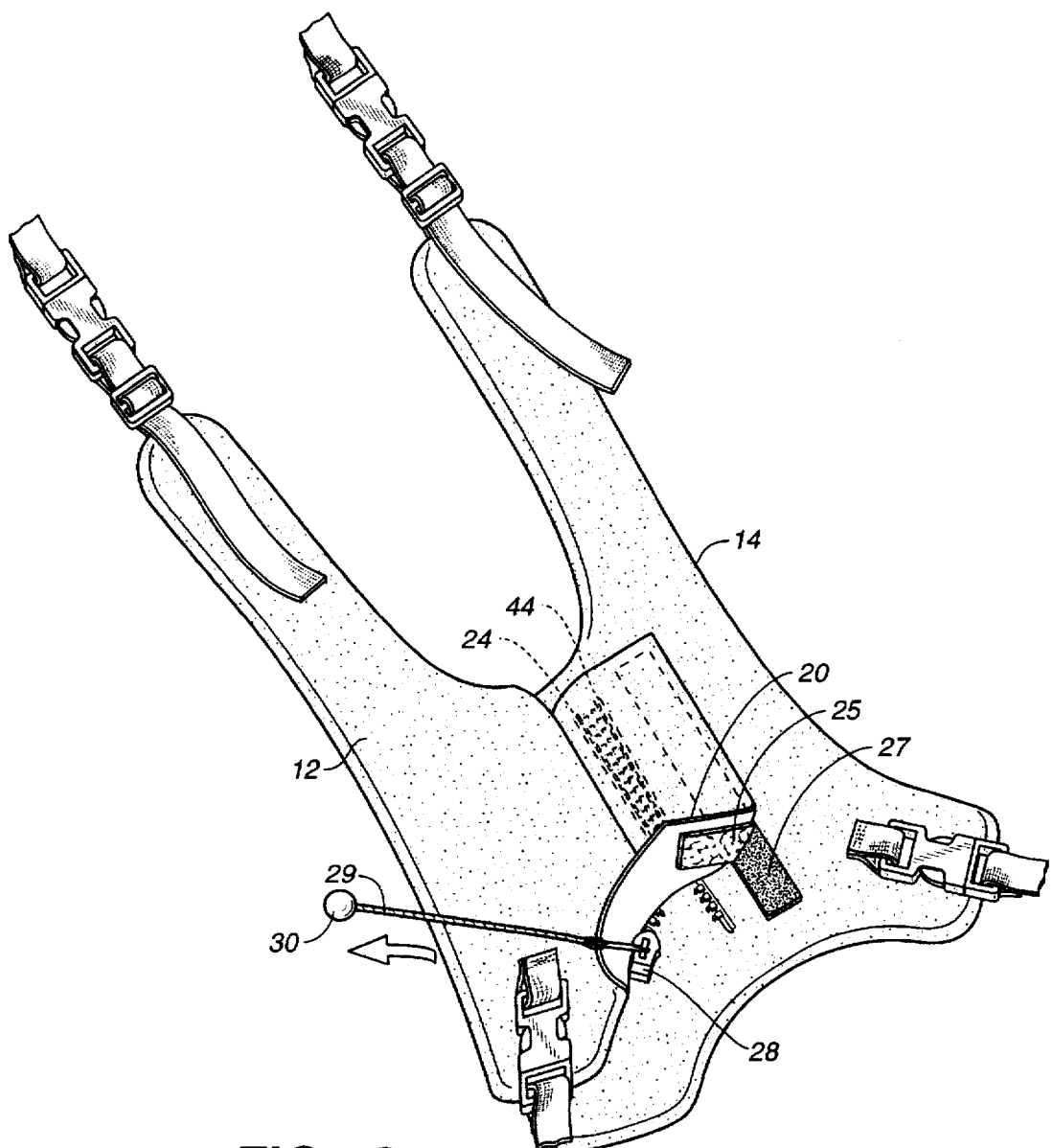
FIG._6

QUICK RELEASE CLOSURE ASSEMBLY

BACKGROUND OF THE INVENTION

1. Field of the Invention

The present invention pertains to harnesses for securing a person into a seat, and more particularly, to a chest and shoulder harness for strapping and securing a child into a seat.

2. Related Art

Commonly used chest harnesses for securing a child into a seat typically include a set of buckles and straps that need to be unbuckled and loosened in order to remove the child from the seat or to allow a care giver access to a feed tube, tracheotomy tube, or the like. While the use of quick release buckles has become more prevalent, chest harnesses still utilize many buckles, which can be time consuming and cumbersome to undo. Non-quick release buckles and looped fastener type straps are even more tedious to undo.

In urgent and emergency situations, quickly undoing buckles is critical. A panicked person can have a difficult time undoing buckles, and thus many conventional buckles can present a problem in such crisis situations. For care givers, it is convenient to have a chest harness that is easily and quickly removed. In addition, it is common for a child to be frequently removed and put back into a seat, such as for example when a parent is running errands with the child. Accordingly, for both safety and convenience, it is desirable to have a chest harness that is quickly removable.

DISCLOSURE OF THE INVENTION

Briefly described, the present invention comprises a closure assembly for releasably securing together two relatively movable pieces, wherein the closure assembly includes a zipper for securing the two pieces together and a draw cord attached to the zipper handle, for pulling on and opening the zipper. The draw cord has a length greater than the zipper, so that the draw cord can be laid along and extend beyond an end of the zipper. The closure assembly also includes a flap fixedly secured to one of the pieces, for covering the zipper. Hook and loop fasteners are provided for releaseably securing the flap to the other of the right and left pieces. The hook and loop fasteners are spaced from the zipper so that the flap forms a sleeve for receiving the draw cord. The right and left pieces can be separated by pulling on the draw cord, first to undo the zipper, and then to pull apart the hook and loop fasteners.

According to an aspect of the invention, the zipper handle is carried by one half of the zipper, which half is secured to one of the right and left pieces, and the flap is fixedly secured to the same piece that the zipper half and handle are secured. In this manner, when the right and left pieces are separated, the flap is removed with the piece to which it is attached. However, the flap could be attached to the other piece and held thereto as the pieces are separated.

According to another aspect of the invention, the other piece to which the other zipper half is secured includes a backing plate underlying the zipper and a portion of the one piece. The backing plate presents a smooth surface against, for example, a person's chest.

In one embodiment of the present invention, a quick release chest harness is provided for securing a person in a seat. The chest harness includes a right harness piece having a right shoulder extension, and a left harness piece including a left shoulder extension. A zipper joins the right and left harness pieces, and a loop is attached to the handle of the zipper for pulling on and opening the zipper. The handle is carried by one half of the zipper, which is secured to one of the right and left harness pieces. A flap is provided for covering the zipper. The flap is attached one of the right and left harness pieces, and hook and loop fasteners are provided for releasably securing the flap to the other of the right and left harness pieces. The right and left harness pieces can be separated by pulling on the loop, first to undo the zipper and then to release the hook and loop fasteners.

According to an aspect of this embodiment of the invention, the hook and loop fasteners are spaced far enough from the zipper so as not to interfere with operation of the zipper. The portion of the flap overlaying the zipper forms a sleeve, and the loop has sufficient length to extend downward through and beyond the sleeve, so that the loop can be grasped in order to open the zipper. When the loop is pulled, the zipper unzips within the sleeve.

According to another aspect of this embodiment of the invention, quick release buckle components are provided for securing the right and left harness pieces to additional harness lines or straps, so that the right and left harness pieces can be easily detached from the additional harness lines.

BRIEF DESCRIPTION OF THE DRAWINGS

The accompanying drawings, which are incorporated in and form a part of this specification, illustrate embodiments of the invention and, together with the description serve to explain the principles of the invention, wherein:

FIG. 1 is a pictorial view of the chest harness of the present invention;

FIG. 2 is an exploded view of the chest harness of FIG. 1;

FIG. 3 is a sectional view, taken along the lines 3–3 of FIG. 1;

FIG. 4 is a pictorial view of the chest harness being worn by a child;

FIGS. 5–6 are pictorial views showing how the quick release mechanism of the chest harness can be used to quickly separate the right and left parts of the chest harness.

DETAILED DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that the described embodiments are not intended to limit the invention to those embodiments. On the contrary, the invention is intended to cover alternatives, modifications and equivalents, which may be included within the spirit and scope of the invention as defined by the appended claims.

Referring to FIGS. 1 and 2, a chest harness 10 of the present invention includes a right harness piece 12 and a left harness piece 14. Right harness piece 12 includes an elongated right shoulder extension 16 and a lower torso portion 18. A narrow flap 20 is secured to the inside edge 22 of torso portion 18. On the inside face of flap 20 is secured a set of VELCRO type hooks 25 that cooperate with corresponding loops 27 on left harness piece 14. Other types of fasteners can be used in place of VELCRO type fasteners. A first half 24 of a zipper 26 is also secured to inside edge 22. Zipper 26 includes a handle 28, which is carried by zipper half 24. A draw cord or loop 29 is tied to handle 28. Draw cord 29 includes a pull knob 30. Draw cord 29 is longer than zipper 26, so that the draw cord can extend along the zipper and past the lower end of the zipper.

An upper quick release buckle 32 and length adjustable strap buckle 34 are secured at the upper end of right shoulder extension 16. A lower quick release buckle 36 is secured adjacent the lower side of torso portion 18.

Left harness piece 14 includes an elongated left shoulder extension 38 and a lower torso portion 40. Lower torso portion 40 includes a plastic backing plate 42 that is sufficiently wide to underlie the lower torso portion 18 of right harness piece 12. A second half 44 of zipper 26 is secured approximately at the center of torso portion 40. Loops 27 are spaced from zipper half 44 so as not to interfere with operation of the zipper. Zipper 26, flap 20, draw cord 29 and fasteners 25, 27 together form a closure assembly for releasably securing together two relatively movable pieces, such as right and left harness pieces 12.

An upper quick release buckle 52 and length adjustable strap buckle 54 are secured at the upper end of left should extension 38. A lower quick release buckle 56 is secured adjacent a lower corner of torso portion 40. Buckles 32, 34, 52, 56 couple with corresponding quick release buckle components that are attached to harness straps which wrap around a persons shoulders, back and hips.

Flap 20 forms a sleeve 60 between itself and torso portion 40 of left harness piece 14, which sleeve 60 is defined between the secured edge of flap 20 and hook and loop fasteners 25, 27. Draw cord 29 is designed to extend downwardly inside of sleeve 60, past the lower end of zipper 26 so that pull knob 30 can be grasped in order to open the zipper. Flap 20 is provided primarily to act as a "guarded" cover for the zipper, making it more difficult for a child to inadvertently or intentionally undo the zipper.

Referring to FIG. 3, right and left harness pieces 12, 14 are each made by forming a flexible plastic backing plate, such as pieces 62, 64 in the shape of the harness pieces, and then adding padding 66 on the underside of plastic piece 64. Stretchable material, such as neoprene 68, 70, encloses the plastic and padding pieces of each harness half 12, 14. Preferably, loops 27 are embedded in neoprene cover 70 in order to reduce the height differential between flap 20 and cover 70.

FIG. 3 illustrates sleeve 60 and how zipper 26 is positioned within the sleeve. The width of sleeve 60 is sufficient to accommodate zipper 26 and allow it to operate with minimal interference from flap 20.

FIG. 4 shows harness 10 fastened around the chest and torso portions of a child 70, who is seated in a car seat 72. From this position, it is easy for an adult to separate the right 12 and left 14 harness sections to remove the child from the car seat or to gain access to a feed tube, tracheotomy tube, or for other medical purposes. Quick release buckles 32, 52 may also be released to facilitate removal of the child. In addition, harness 10 also functions to properly position the child so that the child does not slide or shift out of a proper seated position.

Referring to FIGS. 5 and 6, a pair of sequential pictorial views of the harness 10 are shown to illustrate the steps for separating the right and left harness pieces. To separate right harness piece 12 from left harness piece 14, draw cord 29 is pulled downwardly by grabbing pull knob 30, as shown by arrow 74, which first causes zipper 26 to undo itself (FIG. 5), and then causes zipper handle 28 to pull on flap 20, which separates the hook and loop fasteners 25, 27 (FIG. 6). This motion can be exercised in one of two ways. One, draw cord 29 can first be pulled downwardly to undo zipper 26 and then can be pulled upwardly, as shown by arrow 76 in FIG. 6, to release hook and loop fasteners 25, 27. Two, draw cord 29 can be continually pulled downwardly, which will both undo the zipper and separate the fasteners in one motion.

With the harness mechanism of the present invention, strapping a child into a car seat, stroller, or similar type child seat and unstraping the child to remove the child from the seat is made easy by the provision of easily releasible left and right harness pieces. Releasing the left and right harness pieces is also made easy with the provision of a one step release mechanism, which comprises the zipper with draw cord and VELCRO fastener.

While the zipper and flap closure assembly discussed herein has been shown and described in combination with a harness mechanism, the closure assembly can also be used for other applications, such as for clothing in place of buttons, zippers, or VELCRO type fasteners, and for luggage and carrying cases and bags, and for many other similar types of goods.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A quick release chest harness for securing a person in a seat, the harness comprising a right harness piece including a right shoulder extension, a left harness piece including a left shoulder extension, a zipper including a handle for joining the right and left harness pieces, a loop attached to the handle of the zipper for pulling on and opening the zipper, the handle being carried by one half of the zipper, which is secured to one of the right and left harness pieces, a flap for covering the zipper, the flap being attached to one of the right and left harness pieces, and a fastener for releasably securing the flap to the other of the right and left harness pieces, wherein the loop is longer than the flap such that an end of the loop extends outward of the flap whereby the right and left harness pieces can be separated by pulling on the loop, first to undo the zipper and then to release the hook and loop fasteners.

2. The quick release chest harness of claim 1, wherein the flap is attached to said one of the right and left harness pieces to which said one half of the zipper and zipper handle are secured.

3. The quick release chest harness of claim 1, wherein the flap is secured to the right harness piece and the left harness piece includes a backing plate, which the right harness piece overlays.

4. The quick release chest harness of claim 3, wherein the portion of the right harness piece adjacent the flap and zipper overlays the backing plate and the right shoulder extension does not.

5. The quick release chest harness of claim 1, wherein the hook and loop fasteners are spaced far enough from the zipper so as not to interfere with operation of the zipper.

6. The quick release chest harness of claim 5, wherein the portion of the flap overlaying the zipper forms a sleeve, and wherein the loop has sufficient length to extend downward through and beyond the sleeve, so that the loop can be grasped in order to open the zipper.

7. The quick release chest harness of claim 1, and further comprising quick release buckle components for securing the right and left harness pieces to additional harness lines, so that the right and left harness pieces can be easily detached from the additional harness lines.

8. The quick release chest harness of claim 7, wherein the right shoulder extension and the left shoulder extension each include a quick release buckle component, and the lower portions of the right and left harness pieces each include a quick release buckle component.

9. The quick release chest harness of claim 8, wherein the quick release buckle components of the right and left shoulder extensions are each adjustably attached to their respective should extensions.

10. The quick release chest harness of claim 1, wherein the fastener includes hook and loop fasteners for releasably securing the flap to the other of the right and left pieces, the hook and loop fasteners being spaced from the zipper so that the flap forms a sleeve for receiving the draw cord.

11. A closure assembly for releasably securing together two relatively movable pieces, comprising a zipper for securing the two pieces together, the zipper including a handle, a draw cord attached to the zipper handle, for pulling on and opening the zipper, the draw cord having a length greater than the zipper, so that the draw cord can be laid along the zipper and extend beyond an end of the zipper, a flap fixedly secured to one of the pieces, for covering the zipper, and a fastener for releaseably securing the flap to the other of the two pieces, the fastener being spaced from the zipper so that the flap forms a sleeve for receiving the draw cord, whereby the two pieces can be separated by pulling on the draw cord, first to undo the zipper, and then to release the fastener.

12. The closure assembly of claim 11, wherein the zipper handle is carried by one half of the zipper, which half is secured to one of the two pieces, and wherein the flap is fixedly secured to said one of the two pieces that the zipper half and handle are secured.

13. The closure assembly of claim 11, wherein the other piece to which the other zipper half is secured includes a backing plate underlying the zipper and a portion of the other piece.

14. The close assembly of claim 11, wherein the fastener is a hook and loop fastener.

15. A closure assembly for releasably securing together two relatively movable pieces, comprising:

a zipper for securing the two pieces together, a cord attached to the zipper for pulling on and opening the zipper, a flap fixedly secured to one of the pieces for covering the zipper, a fastener for releasably securing the flap to the other of the two pieces, the fastener being spaced from the zipper to form a sleeve for receiving the cord, the cord being longer than the flap so that an end of the cord extends beyond the flap in a manner permitting the cord to be grasped, whereby the two pieces can be separated by pulling on the cord, first to undo the zipper, and then to release the fastener.

16. The closure assembly of claim 15, wherein the cord is attached to a zipper half that is secured to the piece fixedly secured to the flap.

17. The closure assembly of claim 15, wherein the cord is flexible to allow it to pull on the zipper from at least two angles.

18. The closure assembly of claim 15, wherein the flap has a length at least as long as the zipper.

19. The closure assembly of claim 15, wherein the fastener comprises hook-and-loop fasteners, with one of said hooks and loops being secured to the flap and the other of said hooks and loops being secured to the other of the two pieces.

* * * * *